(12) United States Patent
VanBlon et al.

(10) Patent No.: US 11,983,314 B2
(45) Date of Patent: May 14, 2024

(54) USER INTERFACE RECONFIGURATION IN VIEW OF IMAGE CAPTURE DEVICE LOCATION

(71) Applicant: Lenovo (Singapore) Pte. Ltd., Singapore (SG)

(72) Inventors: Russell Speight VanBlon, Raleigh, NC (US); Nathan Peterson, Oxford, NC (US); Mark Delaney, Raleigh, NC (US); Arnold Weksler, Raleigh, NC (US); John C Mese, Cary, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 17/853,226

(22) Filed: Jun. 29, 2022

(65) Prior Publication Data
US 2024/0004461 A1  Jan. 4, 2024

(51) Int. Cl.
*H04N 7/15* (2006.01)
*G06F 3/01* (2006.01)

(52) U.S. Cl.
CPC .............. *G06F 3/013* (2013.01); *H04N 7/15* (2013.01)

(58) Field of Classification Search
CPC ............ G06F 3/01; G06F 3/012; G06F 3/013; H04N 7/15; H04N 7/147
USPC ............................................ 348/14.01–14.16
See application file for complete search history.

(56) References Cited

U.S. PATENT DOCUMENTS

| | | | |
|---|---|---|---|
| 2011/0193935 A1* | 8/2011 | Gorzynski | H04N 7/142 348/E7.083 |
| 2021/0405865 A1* | 12/2021 | Faulkner | H04N 7/147 |
| 2022/0256094 A1* | 8/2022 | Meyer | H04N 23/672 |
| 2022/0286314 A1* | 9/2022 | Meyer | G06F 3/013 |

\* cited by examiner

*Primary Examiner* — Melur Ramakrishnaiah
(74) *Attorney, Agent, or Firm* — FERENCE & ASSOCIATES LLC

(57) ABSTRACT

One embodiment provides a method, the method including: capturing, at an interface reconfiguration system and using an image capture device, video of a user, wherein the video is transmitted to an information handling device of at least one other user; determining, using the interface reconfiguration system, eyes of the user are directed away from the image capture device and a portion of a user interface associated with a direction of the eyes of the user; and rearranging, responsive to the determining, at least the portion of the user interface displayed on a display device operatively coupled to the image capture device. Other aspects are claimed and described.

18 Claims, 3 Drawing Sheets

USER INTERFACE RECONFIGURATION IN VIEW OF IMAGE CAPTURE DEVICE LOCATION

BACKGROUND

With an increase in remote working and having workers located in different geographical locations, video conferencing is a popular medium for conducting meetings, conferences, and other communications including multiple participants. Additionally, video conferencing is used by users to conduct personal communications, for example, using video telephone applications, and the like. Video calls or conferences, referred to collectively as video conferences, provide an added benefit over traditional telephone calls by allowing each participant to see a video feed from other participants. The video feed is usually a video feed containing the participant, allowing the participants to feel another level of connection over regular telephone communications. Additionally, video conferencing may provide other features, for example, screen sharing, connection to other video feeds within a room, and/or the like.

BRIEF SUMMARY

In summary, one aspect provides a method, the method including: capturing, at an interface reconfiguration system and using an image capture device, video of a user, wherein the video is transmitted to an information handling device of at least one other user; determining, using the interface reconfiguration system, eyes of the user are directed away from the image capture device and a portion of a user interface associated with a direction of the eyes of the user; and rearranging, responsive to the determining, at least the portion of the user interface displayed on a display device operatively coupled to the image capture device.

Another aspect provides an information handling device, the information handling device including: an image capture device; a display device operatively coupled to the image capture device; a processor operatively coupled to the image capture device and the display device; a memory device that stores instructions that, when executed by the processor, causes the information handling device to: capture, at an interface reconfiguration system and using the image capture device, video of a user, wherein the video is transmitted to an information handling device of at least one other user; determine, using the interface reconfiguration system, eyes of the user are directed away from the image capture device and a portion of a user interface associated with a direction of the eyes of the user; and rearrange, responsive to the determining, at least the portion of the user interface displayed on the display device.

A further aspect provides a product, the product including: a computer-readable storage device that stores executable code that, when executed by a processor, causes the product to: capture, at an interface reconfiguration system and using an image capture device, video of a user, wherein the video is transmitted to an information handling device of at least one other user; determine, using the interface reconfiguration system, eyes of the user are directed away from the image capture device and a portion of a user interface associated with a direction of the eyes of the user; and rearrange, responsive to the determining, at least the portion of the user interface displayed on a display device operatively coupled to the image capture device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
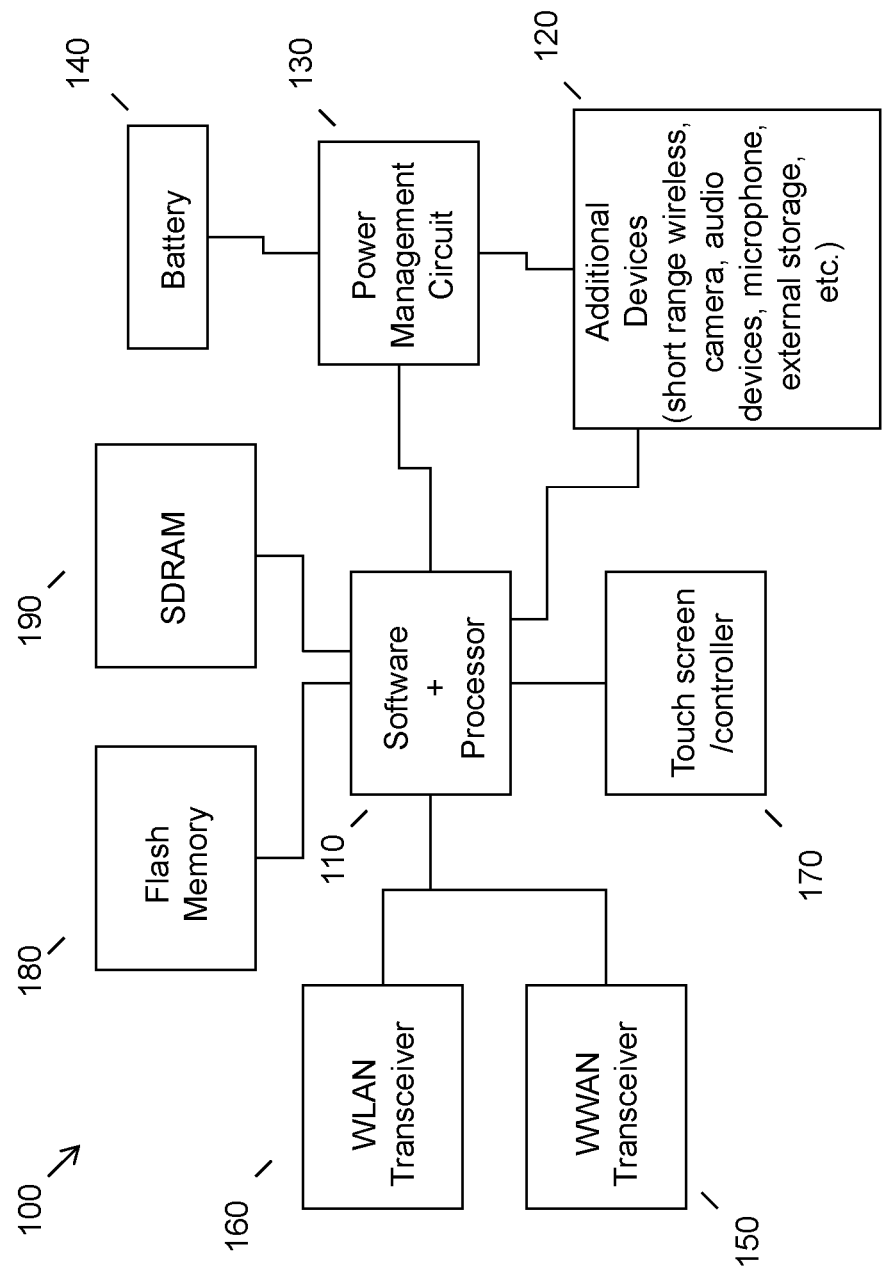
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While it may be advantageous or desirable to be able to see other participants on a video conference, a problem that arises for participants is remembering or being able to look into the camera or other image capture device so that other participants feel that the participant is engaged in the conference. However, it is common for participants in a conference or other meeting to be performing other tasks during the conference or meetings, for example, taking notes, referring to presentation materials, looking at a video feed of one or more other participants, viewing notifications, and/or the like. When performing these tasks, the user is generally turned away from a direct line of the image capture device. Thus, the view within the video feed being transmitted to other participants makes it appear that the user is not engaged in the meeting. Since other participants cannot see what users are doing because the video feed is only a small view of the user and the environment of the user, the other participants do not know that the user is actually engaged in the conference.

One traditional technique to make it appear that the user is looking at the image capture device even when the user may be looking at a different location on the display, within the environment, and/or the like, is using software to modify the eyes of the user. This technique relies on a digital alteration method to digitally alter the eyes of the user to make them appear to be looking in the direction of the image capture device. This technique can make the user look unnatural since the user is being digitally altered. Additionally, this technique requires the installation of specialized software to perform the altering and not all conferencing applications support this software.

Another technique to make it appear that the user is looking at the image capture device is utilizing additional hardware components. The user can set up multiple image capture devices at different physical locations around the display and/or environment of the user. As the eyes of the user move around the display and/or environment, the system changes the image capture device that is being utilized to capture the video feed that is being transmitted to other participants. However, this requires additional image capture devices, which can become costly and require extra space, but also require ports, software, and other information handling device features to support the additional image capture devices. Additionally, not all software may support multiple image capture devices. Another problem is that if the eyes of the user move frequently, the frequent changes in the image capture device may become jarring for other participants.

Accordingly, the described system and method provides a technique for rearranging a user interface based upon a location of the eyes of a user and a physical location of an image capture device. The interface reconfiguration system captures, using an image capture device, video of a user, where the video is being transmitted to an information handling device of another user. For example, the user may be utilizing a video conferencing or meeting application, video telephone application, and/or the like. For ease of readability, the term video conference or video conferencing will be used here throughout. However, this is not intended to limit the scope of this disclosure to only video conference software or applications, as the described system and method can be applied to any application, program, and/or system that allows for transmission of video from one user to another user.

From the video the interface reconfiguration system determines if the eyes of the user are directed away from the image capture device. One technique to perform this determination is to determine if the user is looking at the image capture device. If the system does not detect the user is looking at the image capture device, the system infers that the user is looking away from the image capture device. It should be noted that looking at the image capture device means looking in a general direction of the physical location of the image capture device such that the eyes of the user appear to be directed at the image capture device within the video feed that is being transmitted to other participants. In addition to determining if the user is looking away from the image capture device, the interface reconfiguration system identifies a portion of the user interface associated with a direction of the eyes of the user.

If the system determines that the user is looking away from the image capture device, the interface reconfiguration system rearranges at least the portion of the user interface that the eyes of the user are directed towards. The interface reconfiguration system rearranges the user interface so that the portion the user is looking towards is moved closer to the physical location of the image capture device. This causes the eyes of the user to appear to be more directed at the image capture device, thereby providing a video feed where the user appears to be looking at the image capture device.

Therefore, a system provides a technical improvement over traditional methods for making a user appear more engaged with other video participants. Instead of relying on specialized software to digitally alter the eyes of a user, the described system and method uses sensors and information already available to the information handling device. Additionally, the described system does not need additional hardware components, for example, multiple image capture devices. Thus, the describe system and method reduces the need for specialized software and extra hardware components. Additionally, since the described system and method does not digitally alter the user or use multiple image capture devices that can frequently change the video feed, the user appears more natural to other participants viewing the video feed of the user. Accordingly, the described system and method provides a technique for changing a view of the user in a video feed that is more natural, less expensive, and more easily implemented than conventional techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
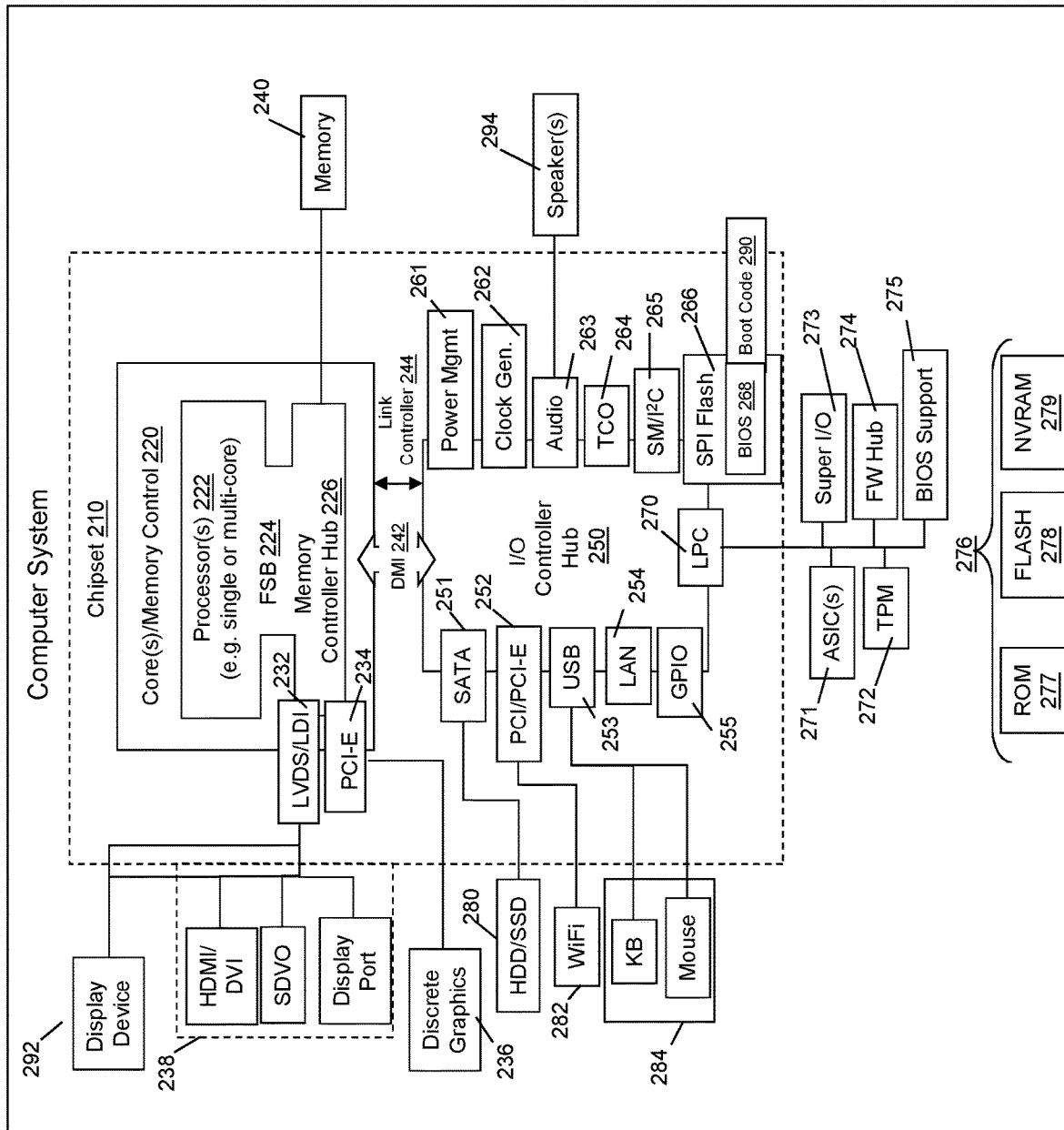
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that rearrange user interfaces and detect a location of eyes of a user. For example, the circuitry outlined in FIG. 1 may be implemented in a tablet or smart phone embodiment, whereas the circuitry outlined in FIG. 2 may be implemented in a personal computer embodiment.

Figure 3:
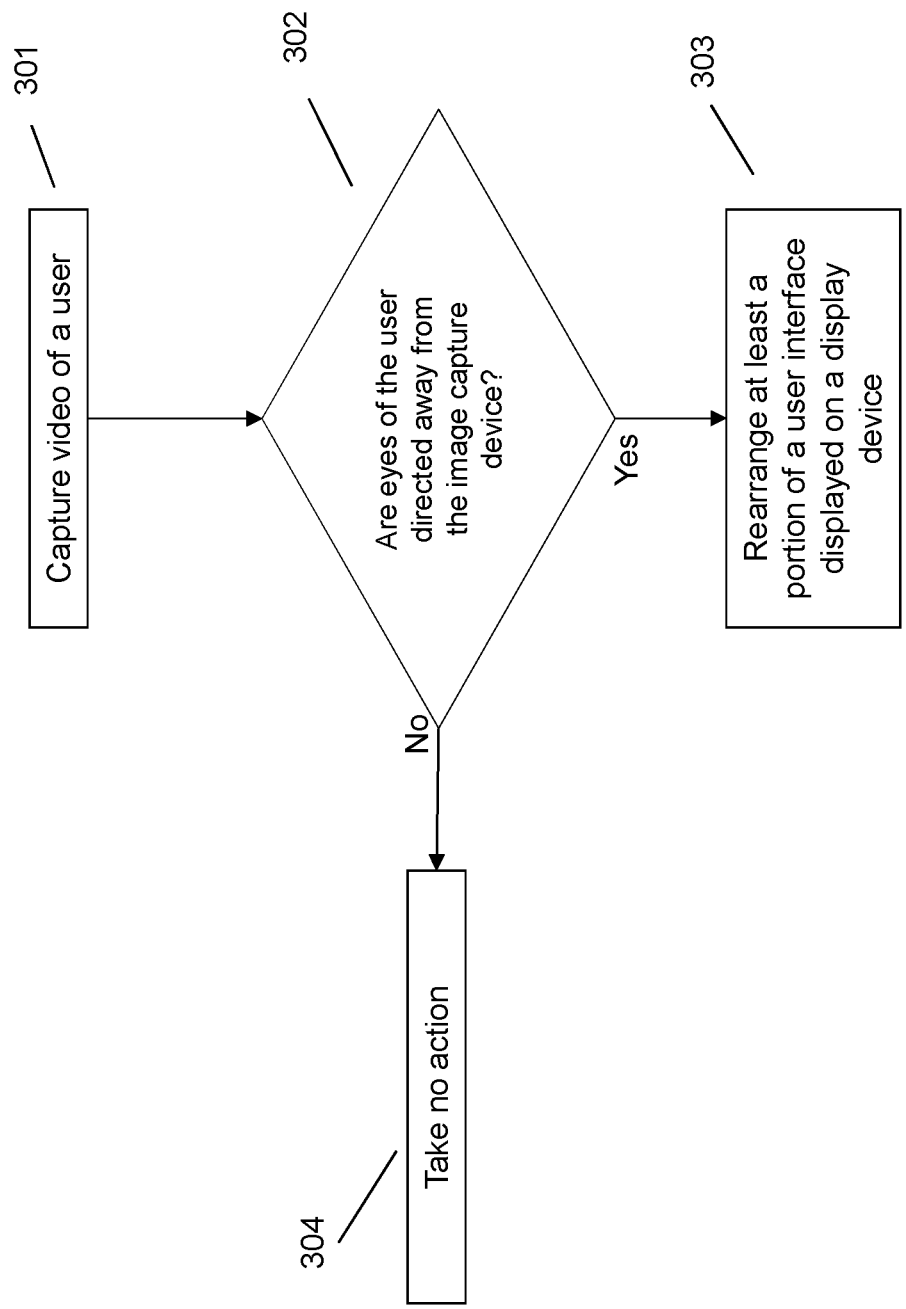
FIG. 3 illustrates an example method for rearranging a user interface based upon a location of the eyes of a user and a physical location of an image capture device.

FIG. 3 illustrates an example method for rearranging a user interface based upon a location of the eyes of a user and a physical location of an image capture device. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to rearrange a user interface based upon a location of the eyes of a user and a physical location of an image capture device. Additionally, the interface reconfiguration system includes modules and features that are unique to the described system.

The interface reconfiguration system may be a stand-alone application that detects the activation of a video conferencing system, video telephone application, and/or the like. As stated previously, for ease of readability, the term video conference or video conferencing system will be used here throughout. However, this is not intended to limit the scope of this disclosure to only video conference software or applications, as the described system and method can be applied to any application, program, and/or system that allows for transmission of video from one user to another user. Upon activation of the video conferencing system, the interface reconfiguration system may be activated either automatically or manually by a user.

The interface reconfiguration system may also be an application or plug-in that is integrated into video conferencing software or applications. Thus, when the video conferencing system is activated, the interface reconfiguration system is also activated. The interface reconfiguration system may also be installed as a stand-alone application and integrated into some video conferencing software. When video conferencing software having the interface reconfiguration system integrated is activated, the stand-alone interface reconfiguration system does nothing. When video conferencing software not having an integrated interface reconfiguration system is activated, the stand-alone interface reconfiguration system is activated.

The interface reconfiguration system may only be activated if an image capture device that can capture video of the user is activated, a video capture mode is activated, and/or the like. Alternatively, the interface reconfiguration system can be activated upon activation of all video conferencing software regardless of whether a video feed is being generated of the user. The user may also designate different applications or software for activation of the interface reconfiguration system. For example, the user may not want the interface reconfiguration system to be activated for personal communication applications, but may want the system to be activated for business applications. The user can also designate specific applications for which the interface reconfiguration system should be activated. For example, the user may want the system to be activated with video conference system A and video telephone system 1, but not video conference system B and video telephone system 2. Thus, the activation of the interface reconfiguration system can be highly user configurable.

At 301, the interface reconfiguration system captures, using an image capture device, video of a user, where the video is transmitted to an information handling device of at least one other user. In other words, the interface reconfiguration system captures a video feed of a user that is transmitted across a video conferencing system. The image capture device may be a camera, infrared sensor, and/or any other device that can capture images and/or video of a user. The image capture device may be coupled to an information handling device that the user is using to engage in the video conferencing software. The image capture device can be directly coupled to the information handling device, for example, integrated into the information handling device, connected directly to the information handling device, and/or the like. The image capture device may also be operatively coupled to the information handling device, meaning it is communicating with the information handling device but is not physically connected to the information handling device. The user may also have multiple image capture devices and the interface reconfiguration system can be utilized with the multiple image capture devices.

The physical location of the image capture device(s) may be known to the interface reconfiguration system. For example, the physical location of the image capture device(s) may be programmed into or exposed to the interface reconfiguration system. The physical location of the image capture device(s) may also be known to the image capture device itself. For example, the image capture device(s) may include sensors that allow the image capture device(s) to identify a physical location of the image capture device(s) with respect to the display, information handling device, user, and/or the like. This information may then be transmitted or otherwise communicated to the interface reconfiguration system. The physical location of the image capture device(s) may also be identified through an initialization or calibration process.

The physical location of the image capture device(s) may also be inferred based upon image analysis and/or gaze tracking information. If the image capture device, or image analysis, determines the eyes of the user appear to be looking at the image capture device, the interface reconfiguration system can identify the general physical location of the image capture device. Similarly, if the image capture device, or image analysis, determines the eyes of the user do not appear to be looking at the image capture device, the interface reconfiguration system can identify the general physical location of the image capture device is not in the direction of the eyes of the user. Over time, the inferred physical location of the image capture device can become more accurate with the receipt of more information, for example, gaze tracking information, image analysis information, and/or the like.

At 302, the interface reconfiguration system determines if the eyes of the user are directed away from the image capture device. In addition to determining if the eyes are directed away from the image capture device, the system identifies a portion of the user interface, displayed on a display device operatively coupled to the image capture device, that is associated with the direction of the eyes of the user. It should be noted that a user looking towards an image capture device refers to the user looking towards a physical location of the objective or lens of the image capture device. This general direction would give the appearance, in the transmitted video feed, that the user is looking directly at other participants or is engaged in the video conference. It should also be noted that the user does not have to look directly at or into the objective of the image capture device to give the appearance, in the video feed, of looking directly at the image capture device. Rather, the user only needs to look in the general direction of the objective of the image capture device.

The proximity to the objective of the image capture device that a user must look may be different for different image capture devices, applications, image capture device settings (e.g., zoom, pan, tilt, etc.), distance from the objective of the image capture device, and/or the like. Thus, the desirable location (i.e., the area on the display device that the user can look while still giving the appearance of looking into the image capture device objective) may change, may be user configurable, may be determined using an initialization feature, may be learned over time, may be computed based upon captured eye direction information, and/or the like.

Determining may include determining if the user is looking in the direction of the image capture device or within the desirable area. If the system detects that the user is looking towards the image capture device or within the desirable area, the system determines that the eyes of the user are not directed away from the image capture device. On the other hand, if the system does not detect that the user is looking towards the image capture device or within the desirable area, the system determines that the eyes of the user are directed away from the image capture device. When the system detects the user is looking away from the image capture device or desirable area, the system may identify a general direction of where the user is looking in order to identify a portion of the user interface at which the user is looking.

Determining if the eyes of the user are directed away from the image capture device may be determined utilizing gaze tracking. Gaze tracking can be performed using the image capture device and image analysis to determine where a user is looking. The gaze tracking may also utilize other sensors, including those located on the information handling device or other devices that may be in operative communication with the information handling device, to determine where the user is looking. When using gaze tracking, the system cannot only identify when a user is looking towards the image capture device, but can also identify an approximate or exact location on the user interface that the user is looking, thus identifying a portion of the user interface at which the user is looking. In other words, the interface reconfiguration system can capture or track a gaze of the user using a gaze tracking device and correlate the location or direction of the gaze of the user with a location on the display device. This location on the display device can further be correlated to a specific portion or object on the display device.

When identifying a portion of the user interface associated with a direction of the eyes of the user, the interface reconfiguration system may attempt to identify an object associated with the portion of the user interface. In other words, the system may attempt to determine what specifically the user is looking at within the user interface. The object may be an application, video feed of another participant, notification, icon, subset of the user interface, and/or the like. In some cases, the interface reconfiguration system may be unable to determine specifically what the user is looking at within the user interface. Accordingly, the system may determine a portion or subset of the user interface, for example, based upon a general direction or location of the eyes of the user with respect to the display device.

Over time the system may be able to infer a specific object the user is likely looking at. For example, if the system determines that a user looks at different locations on the user interface at different times, but a common object at those locations is a particular application, the system may infer that the user is looking at the particular application. Thus, the system may make the determination of what a user is looking at over time over a plurality of video captures. In other words, the system may monitor the user as the user engages in different instances of video conferencing. During each instance, the system may identify objects at which the user looks. Using this information, the system may learn what objects the user frequently looks at on the user interface. In other words, the system may employ a type of machine-learning to learn about what the user looks at so that the interface reconfiguration system can take more accurate actions when rearranging the user interface, as discussed in more detail below.

What a user chooses to look at may be different for different types of video conferences. For example, the user may commonly look at one object or object type during personal conferences and other objects or object types during business conferences. As another example, the user may commonly look at one object or object type during conferences with certain people and other objects or object types during conferences with other people. As another example the user may commonly look at one object or object type during conferences being directed to a particular topic and other objects or object types during conferences with other people. As a final, but non-limiting example, the user may commonly look at one object or object type during conferences where the user is speaking or presenting and other objects or object types during conferences where the user is not speaking or presenting.

When determining if the eyes of the user are directed away from the image capture device and a portion of the user interface the eyes of the user are directed towards, the interface reconfiguration system may identify other characteristics about where the user is looking. One characteristic includes a length of time the user is not looking towards the image capture device or desirable area. If the user briefly looks away from the image capture device or desirable area, the interface reconfiguration system may not want to take any action with respect to the user interface. However, if the user looks away from the image capture device for a longer length of time, the interface reconfiguration system may want to take action with respect to the user interface, as discussed in more detail further herein. The length of time that results in the interface reconfiguration system taking action with respect to the user interface may be a default threshold, a user configurable threshold, different thresholds for different video conference types or characteristics (e.g., personal vs. business, different conference topics, different conference attendees, different conference times and/or days, etc.), and/or any other predetermined threshold.

Another characteristic may include a frequency that the user looks away from the image capture device, the user looks at a particular portion of the display device, the user looks at a particular object of the user interface, and/or other frequency information. The frequency can be identified and stored over a plurality of video captures or video conference instances or may be identified for an individual video conference instances. When identifying the frequency, the interface reconfiguration system may identify what objects, portions of the display or user interface, sub-portions of the display or user interface, and/or the like, the user looks at most frequently as compared to objects, portions, sub-portions, and/or the like, the user looks at less frequently.

When identifying the frequency, the interface reconfiguration system may generate a display frequency map that indicates the objects, portions of the display or user interface, sub-portions of the display or user interface, and/or the like, and a frequency of viewing associated with that object, portion, sub-portion, and/or the like. To improve accuracy, the interface reconfiguration system may also take into account a length of time that an object, portion, sub-portion, and/or like, was viewed by the user. This information may also be included in the display frequency map. In other words, the display frequency map indicates a frequency and/or overall length of time the eyes of the user are at a particular location on the display device, where the particular location may correspond to a user interface object that may move, portion of the display or user interface, sub-portion of the display or user interface, and/or the like.

The resulting display frequency map may have similarities to a heat map where objects, portions, sub-portions, and/or the like, viewed more frequently and/or for longer overall lengths of time are visually represented as being "hotter" than object, portions, sub-portions, and/or the like, viewed less frequently and/or for shorter overall lengths of time. In this heat map example, the display frequency map may have "heat" gradients, thereby resulting in the use of multiple colors. Additionally, or alternatively, the display frequency map may simply have a counter and/or timer associated with different objects, portions, sub-portions, and/or the like. The display frequency map may be an overall display frequency map where all video conference instances are included or reflected within the map. The interface reconfiguration system may also generate different display frequency maps based upon different video conferencing characteristics (e.g., personal vs. business, different conference topics, different conference attendees, different conference times and/or days, etc.).

If the interface reconfiguration system determines that the eyes of the user are not directed away from the image capture device at 302, the interface reconfiguration system may take no action at 304. The interface reconfiguration system may also continue to track or monitor the eyes of the user and iteratively perform step 302 and make a determination. Additionally, the interface reconfiguration system may store the information associated with the determination that the eyes of the user are note directed away form the image capture device. It should also be noted that the system may determine that the eyes of the user are not directed away from the image capture device at 302 if the eyes of the user are directed away from the image capture device for a length of time shorter than a predetermined threshold, if a predetermined threshold is configured or being utilized. In other words, the eyes of the user may move from the image capture device location, but the system may still make a determination that the eyes are not directed away from the image capture device unless the eyes are directed away for at least a threshold length of time.

On the other hand, if the interface reconfiguration system determines the eyes of the user are directed away from the image capture device at 302, the interface reconfiguration system may rearrange at least the portion of the user interface at 303. The determination may be responsive to determining the eyes of the user are directed away from the image capture device for a length of time longer than the predetermined threshold, if a predetermined threshold is configured of being utilized. In rearranging the user interface, the desired goal or purpose of the interface reconfiguration system is to move objects on the user interface that a user is viewing to a location closer to the image capture device so that the user appears to be looking at or at least looking in a general direction of the image capture device, thereby resulting in a video feed of the user where the user appears to be looking at the image capture device and/or engaged in the video conference.

However, as readily understood, display devices only have so much space. Additionally, the space that is near the image capture device or within the desirable area is even smaller. Accordingly, the interface reconfiguration system cannot move everything within the user interface to the desirable area. Thus, the interface reconfiguration system adds some intelligence to the rearranging and identifying which objects should be moved to the desirable area. One technique is to move objects, portions, sub-portions, and/or the like, (collectively referred to as "objects"), that are more frequently viewed closer to a physical location of the image capture device or within the desirable area as compared to objects that are less frequently viewed. To this end, the display frequency map may be utilized to identify which objects should be moved closer to or within the desirable area. Since the interface reconfiguration system may generate multiple display frequency maps, the system may identify one or more characteristics of the current video conferencing instance and utilize the display frequency map corresponding to the identified characteristic(s).

When performing the rearranging, the objects may be moved quickly to the desirable area. For example, when performing the rearranging, the interface reconfiguration system may "snap" the identified object to the desirable area. The rearranging may also include moving objects slowly or iteratively to the desirable area. In other words, the rearranging may include iteratively rearranging the objects over time throughout the video conferencing instance. This results in the object(s) being moved to the desirable area in increments which may provide a less jarring experience for the user. The distance each iteration moves the object(s) may be based upon a default setting, a user configured setting, a combination thereof, and/or the like. The iterative distance may also vary with each movement. For example, the iterative distance may be based upon a distance the object(s) is from the desirable area, a proportion of the distance to the desirable area, a length of the video conferencing instance, and/or the like. The interface reconfiguration system may also utilize a combination of "snapping" and iterative movement of objects. The user may also configure different objects as being "snap" objects or iterative objects.

The rearranging may not only include objects that are currently displayed on the user interface, but may also include objects that are opened or added to the user interface during the video conferencing instance. For objects that are added to the user interface during the video conferencing instance, the interface reconfiguration system may automatically move these to within the desirable area since it is highly likely the user is looking at the newly added object since the user decided to add the object. Similarly, objects that have a high likelihood of viewing during video conferencing instances may be moved to the desirable area. For example, a screen sharing application activated by the user during the video conferencing instance, a screen sharing application activated by another participant during the video conferencing instance, a change in a presentation being presented during the video conferencing instance, and/or the like, are all example objects that the user is likely looking at if detected during the video conferencing instance.

Additionally, the rearranging may also include objects that are temporary, for example, notifications, pop-up windows, and/or the like. For temporary objects, the interface reconfiguration system may provide the temporary object within the desirable area when the temporary object is first activated or added to the user interface. For example, if a notification is provided within the user interface, the notification may first appear in the desirable area instead of a default notification area of the user interface. As another example, if the user looks at or watches the video feed of an active speaker, as the active speaker changes, the interface reconfiguration system may swap, within the desirable area, the video feeds of the participants to be the active speaker.

The rearranging may occur at the beginning of a video conferencing instance based upon historical information, may occur over a single video conferencing instance as frequency information is identified, a combination thereof, and/or the like. The rearranging may also allow some user configurability. For example, the user can configure objects as "snap" objects, iterative objects, no move objects that will not be moved, and/or the like. As another example, the user can configure whether objects are moved in a "snap" motion or an iterative motion. The user may configure a speed or distance of iterative motion, meaning the user can define how quickly objects are moved towards the desirable area. The user may configure which objects should be prioritized for proximity to the physical location of the image capture device. The user may also configure the location, size, shape, and/or other characteristics of the desirable area. The user may also dock certain objects to interface sections or portion. If the system detects these are frequently viewed and should be moved, the system may move the entire section or portion.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   capturing, at an interface reconfiguration system and using an image capture device, video of a user, wherein the video is transmitted to an information handling device of at least one other user;
   determining, using the interface reconfiguration system, eyes of the user are directed away from the image capture device, wherein the determining comprises identifying a gaze of the user is not within a predetermined area with respect to the image capture device and that a length of time of the gaze being directed away from the image capture device exceeds a predetermined threshold;
   determining, based upon the eyes of the user being directed away from the image capture device, a portion of a user interface associated with a direction of the eyes of the user; and
   rearranging, responsive to the determining the eyes of the user are directed away from the image capture device and the determining a portion of the user interface and based upon the predetermined area, at least the portion of the user interface displayed on the display device operatively coupled to the image capture device.

2. The method of claim 1, wherein the determining is performed over a plurality of video captures and wherein the rearranging is based upon information regarding a location of the eyes of the user captured over the plurality of video captures.

3. The method of claim 1, wherein the determining comprises generating a display frequency map indicating a frequency of the eyes of the user at a particular location on the display device.

4. The method of claim 3, wherein the rearranging is based upon the display frequency map and portions of the user interface corresponding to more frequently viewed locations are moved closer to a physical location of the image capture device as compared to less frequently viewed locations.

5. The method of claim 1, wherein the determining comprises capturing a gaze of the user using a gaze tracking device and correlating the gaze of the user with a location on the display device.

6. The method of claim 1, wherein the rearranging comprises iteratively rearranging the at least the portion over time.

7. The method of claim 1, wherein the rearranging comprises moving the at least the portion towards a physical location of the image capture device.

8. The method of claim 1, wherein the rearranging is applied to portions of the user interface that are temporary.

9. The method of claim 1, wherein the rearranging is based upon user preferences.

10. An information handling device, the information handling device comprising:
    an image capture device;
    a display device operatively coupled to the image capture device;
    a processor operatively coupled to the image capture device and the display device;
    a memory device that stores instructions that, when executed by the processor, causes the information handling device to:
    capture, at an interface reconfiguration system and using the image capture device, video of a user, wherein the video is transmitted to an information handling device of at least one other user;
    determine, using the interface reconfiguration system, eyes of the user are directed away from the image capture device, wherein the determining comprises identifying a gaze of the user is not within a predetermined area with respect to the image capture device and that a length of time of the gaze being directed away from the image capture device exceeds a predetermined threshold;

determine, based upon the eyes of the user being directed away from the image capture device, a portion of a user interface associated with a direction of the eyes of the user; and rearrange, responsive to the determining the eyes of the user are directed away from the image capture device and the determining a portion of the user interface and based upon the predetermined area, at least the portion of the user interface displayed on the display device operatively coupled to the image capture device.

11. The information handling device of claim 10, wherein the determining is performed over a plurality of video captures and wherein the rearranging is based upon information regarding a location of the eyes of the user captured over the plurality of video captures.

12. The information handling device of claim 10, wherein the determining comprises generating a display frequency map indicating a frequency of the eyes of the user at a particular location on the display device.

13. The information handling device of claim 12, wherein the rearranging is based upon the display frequency map and portions of the user interface corresponding to more frequently viewed locations are moved closer to a physical location of the image capture device as compared to less frequently viewed locations.

14. The information handling device of claim 10, wherein the determining comprises capturing a gaze of the user using a gaze tracking device and correlating the gaze of the user with a location on the display device.

15. The information handling device of claim 10, wherein the rearranging comprises iteratively rearranging the at least the portion over time.

16. The information handling device of claim 10, wherein the rearranging comprises moving the at least the portion towards a physical location of the image capture device.

17. The information handling device of claim 10, wherein the rearranging is applied to portions of the user interface that are temporary.

18. A product, the product comprising:

a computer-readable storage device that stores executable code that, when executed by a processor, causes the product to:

capture, at an interface reconfiguration system and using an image capture device, video of a user, wherein the video is transmitted to an information handling device of at least one other user;

determine, using the interface reconfiguration system, eyes of the user are directed away from the image capture device, wherein the determining comprises identifying a gaze of the user is not within a predetermined area with respect to the image capture device and that a length of time of the gaze being directed away from the image capture device exceeds a predetermined threshold;

determine, based upon the eyes of the user being directed away from the image capture device, a portion of a user interface associated with a direction of the eyes of the user; and rearrange, responsive to the determining the eyes of the user are directed away from the image capture device and the determining a portion of the user interface and based upon the predetermined area, at least the portion of the user interface displayed on the display device operatively coupled to the image capture device.

* * * * *